(12) United States Patent
Bortnick et al.

(10) Patent No.: US 7,346,413 B2
(45) Date of Patent: Mar. 18, 2008

(54) PRODUCTIVITY FOR TOOL HAVING PLURALITY OF PROCESSING MODULES

(75) Inventors: Beverly S. Bortnick, Hinesburg, VT (US); Donald P. Martin, Essex Junction, VT (US); James R. Morrison, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 10/908,345

(22) Filed: May 9, 2005

(65) Prior Publication Data

US 2006/0253216 A1 Nov. 9, 2006

(51) Int. Cl.
G06F 19/00 (2006.01)

(52) U.S. Cl. .................. 700/111; 700/104; 700/108; 700/109; 700/110; 700/182

(58) Field of Classification Search ............. 700/104, 700/108, 109, 110, 111, 182
See application file for complete search history.

(56) References Cited

U.S. PATENT DOCUMENTS 5,971,585 A 10/1999 Dangat et al.
6,198,980 B1 * 3/2001 Costanza ................... 700/99
6,263,255 B1 * 7/2001 Tan et al. .................. 700/121
6,467,605 B1 * 10/2002 Head, III ............... 198/341.07
6,701,203 B2 3/2004 Martin et al.
6,738,686 B2 * 5/2004 Caretta et al. ............. 700/213
6,772,029 B2 8/2004 Kobayashi et al.
6,823,228 B2 11/2004 Funke et al.
2002/0052667 A1 5/2002 Martin et al.

OTHER PUBLICATIONS

Foster, J. et al., "Implementation of Best Known Methods," IEEE/SEMI Advanced Semiconductor Manufacturing Conference, 2000, pp. 181-186.
Connors, D. et al., "Method for Rapid Performance Analysis and Design of Semiconductor Manufacturing Facilities," IBM Technical Disclosure Bulletin, vol. 36, No. 12, Dec. 1993, pp. 423-424.

* cited by examiner

*Primary Examiner*—Michael D. Masinick
(74) *Attorney, Agent, or Firm*—Richard M. Kotulak; Hoffman, Warnick & D'Alessandro LLC

(57) ABSTRACT

Method, system and program product are disclosed for determining productivity for a tool including a plurality of processing modules. The invention provides an understanding of a relationship between measured variables and overall tool speed by calculating computational components for any empty module, any module speed diversity and any idle tool event, i.e., the potential productivity detractors for the tool. An overall productivity based on each of the computational components may also be determined.

20 Claims, 3 Drawing Sheets

PRODUCTIVITY FOR TOOL HAVING PLURALITY OF PROCESSING MODULES

TECHNICAL FIELD

The present invention relates generally to semiconductor fabrication, and more particularly, to a methodology for determining productivity for a tool including a plurality of processing modules.

RELATED ART

Optimization of equipment usage in any manufacturing setting is important due to the investment required to purchase equipment. This situation is especially significant in the semiconductor fabrication industry. Current approaches to productivity analysis focus either on the performance of a piece of the system or the entire system as a whole. As a result, an understanding of the entire system based on knowledge of components of the system and their interactions is currently unavailable. For example, determination of processing degradations due to modules in processing equipment either being empty or idle, or having a recipe being implemented therein that causes a speed diversity between lots, is currently unavailable.

In view of the foregoing, there is a need in the art for a methodology for determining productivity that does not suffer from the problems of the related art.

SUMMARY OF THE INVENTION

The invention includes a method, system and program product for determining productivity for a tool including a plurality of processing modules. The invention provides an understanding of a relationship between measured variables and overall tool speed by calculating computational components for any empty module, any module speed diversity and any idle tool event, i.e., the potential productivity detractors for the tool. An overall productivity based on each of the computational components may also be determined.

A first aspect of the invention is directed to a method for determining productivity for tool including a plurality of processing modules, the method comprising the steps of: receiving a plurality of variables relating to processing degradation on the plurality of processing modules; calculating a computational component for any empty module, any module speed diversity and any idle tool event; and determining the productivity based on at least one of the computational components.

A second aspect of the invention includes a system for determining productivity for a tool including a plurality of processing modules, the system comprising: means for receiving a plurality of variables relating to processing degradation on the plurality of processing modules; means for calculating a computational component for any empty module, any module speed diversity and any idle tool event; and means for determining the productivity based on at least one of the computational components.

A third aspect of the invention related to a program product stored on a computer readable medium for determining productivity for a tool including a plurality of processing modules the computer readable medium comprising program code for performing the following steps: receiving a plurality of variables relating to processing degradation on the plurality of processing modules; calculating a computational component for any empty module, any module speed diversity and any idle tool event; and determining the productivity based on at least one of the computational components.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION

For convenience purposes only, the description includes the following headings: I. Processing Tool Overview, II. System Overview, III. Operational Methodology, and IV. Conclusion.

I. Processing Tool Overview:

The invention includes a method, system and program product for determining productivity for a tool including a plurality of processing modules. The method receives a plurality of variables relating to processing degradation on the plurality of processing modules, and then calculates a computational component for any empty module, any module speed diversity and any idle tool event. Each computational component represents degradation below a maximum productivity $P_{max}$. Productivity can be determined based on at least one of the computational components or each of them.

The invention will be described in terms of a semiconductor device fabrication setting. It should be recognized, however, that the teachings of the invention are applicable to any manufacturing setting. For purposes of description, a photolithography cluster will be modeled as a sequence of processing stations or modules m1, m2, . . . mM. A photolithography cluster may include, for example, the modules for resist apply, pre-expose baking of the resist, the stepper staging and expose operations and post expose baking, among others. The processing time for a wafer in a module may be assumed independent of the module in which the processing is taking place, however the invention may still be applied even if this assumption is not made, i.e., the method results in an approximation without the assumption. The fixed processing time D for a wafer in a module may include wafer transport time and loading-unloading of the module.

Figure 1A:
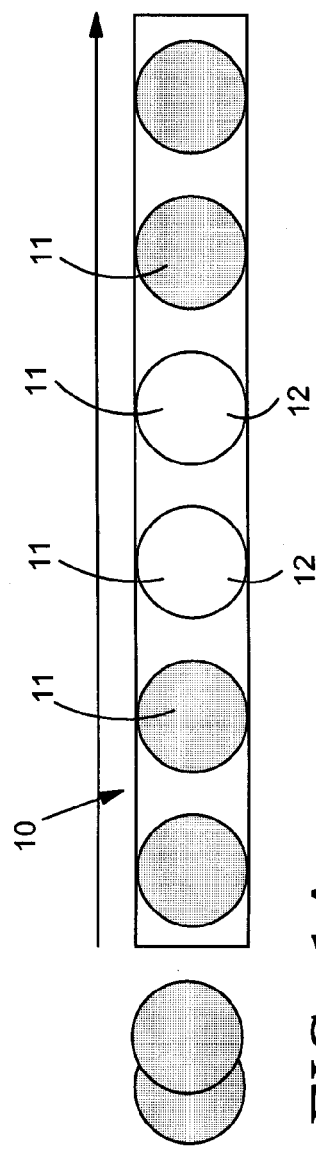
FIGS. 1A–C show a tool including a plurality of processing modules, each figure illustrating a different potential productivity detractor.
Figure 1B:
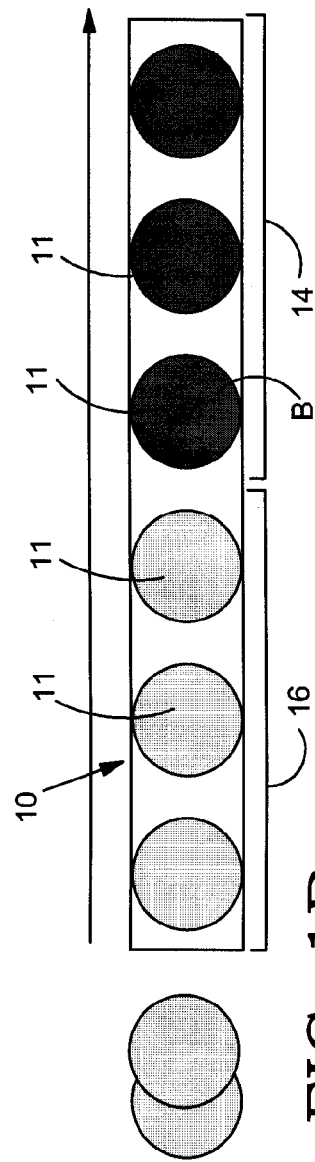
Figure 1C:
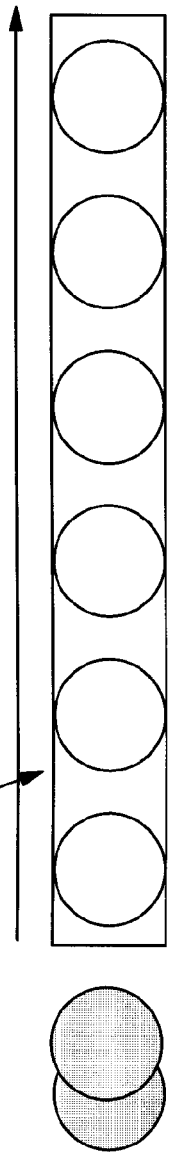

FIGS. 1A–C illustrate a schematic diagram that will be used to describe the productivity detractors that the invention addresses. FIGS. 1A–C show a tool 10 including a plurality of modules 11 (circles). FIG. 1A illustrates degradation in processing because of empty modules 12. FIG. 1B illustrates degradation in processing because of a module speed diversity. Module speed diversity occurs when two lots with different speeds having different module processing times are in production within the tool. FIG. 1B shows a first lot 14 of parts being processed through modules 11 (from left-to-right) by a first, slower recipe 1 and a second lot 16 of parts being processed by a second, faster recipe 2.

As a result, the processing of second lot 16 is slowed by the processing of first lot 14. FIG. 1C illustrates degradation processing because of an idle tool event, i.e., the entire tool 10 is empty because of, for example, maintenance.

In any event, semiconductor wafers arrive to tool 10 in lots (batches) including a number of wafers W. Wafers proceed through the modules sequentially. When a last wafer of a given lot leaves the first module, the first wafer of a following lot enters the first module and begins processing, assuming the queue is not empty in which case the first module is not in use. In many cases, the modules do not all have the same processing time for a particular lot. For example, there may be one or more modules that have a processing time greater than others, resulting in a bottleneck processing time. The invention assumes that all modules have this bottleneck processing time when determining a maximum throughput. (However, the other detractors are approximate for systems not satisfying the uniform module processing time assumption.) The invention may be adapted to situations where multiple paths for wafers at a given module exist, for example, where two modules are devoted to one bottleneck process to increase the throughput. In this case, the bottleneck processing time is divided by the number of modules associated with the bottleneck process, and this stage of processing is counted as two modules (for the determination of total modules).

For purposes of description, productivity will be denoted generically as P with appropriate distinguishing subscripts, where necessary. As one with skill in the art will understand, productivity can be described in terms of various units. For purposes of description, parts per hour (PPH) units may be used. It is emphasized, however, that the units of productivity may be varied without departing from the scope of the invention.

Figure 2:
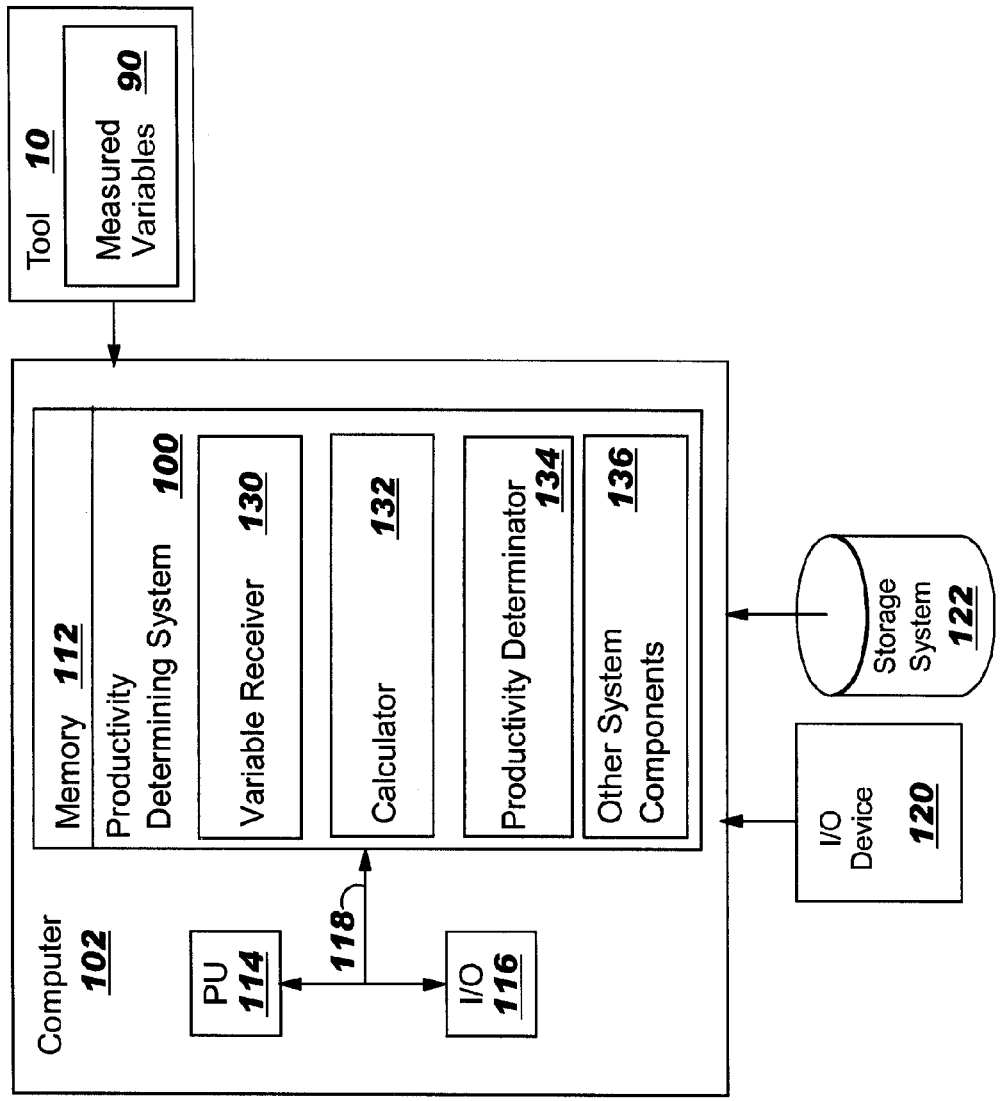
FIG. 2 shows a block diagram of a productivity determining system according to the invention.

II. System Overview:

With reference to the accompanying drawings, FIG. 2 is a block diagram of a productivity determination system 100 in accordance with the invention. System 100 is connected to tool 10 and receives, in any now known or later developed fashion, measured variables 90 from tool 10 and/or modules 11 thereof. System 100 is shown implemented on computer 102 as computer program code. To this extent, computer 102 is shown including a memory 112, a processing unit (PU) 114, an input/output (I/O) interface 116, and a bus 118. Further, computer 102 is shown in communication with an external I/O device/resource 120 and a storage system 122. In general, processing unit 114 executes computer program code, such as system 100, that is stored in memory 112 and/or storage system 122. While executing computer program code, processing unit 114 can read and/or write data to/from memory 112, storage system 122, and/or I/O device 120. Bus 118 provides a communication link between each of the components in computer 102, and I/O device 120 can comprise any device that enables user to interact with computer 102 (e.g., keyboard, pointing device, display, etc.).

Alternatively, a user can interact with another computing device (not shown) in communication with computer 102. In this case, I/O interface 116 can comprise any device that enables computer 102 to communicate with one or more other computing devices over a network (e.g., a network system, network adapter, I/O port, modem, etc.). The network can comprise any combination of various types of communications links. For example, the network can comprise addressable connections that may utilize any combination of wired and/or wireless transmission methods. In this instance, the computing devices (e.g., computer 102) may utilize conventional network connectivity, such as Token Ring, Ethernet, WiFi or other conventional communications standards. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer 102 is only representative of various possible combinations of hardware and software. For example, processing unit 114 may comprise a single processing unit, or be distributed across one or more processing units in one or more locations, e.g., on a client and server. Similarly, memory 112 and/or storage system 122 may reside at one or more physical locations. Memory 112 and/or storage system 122 can comprise any combination of various types of computer-readable media and/or transmission media including magnetic media, optical media, random access memory (RAM), read only memory (ROM), a data object, etc. I/O interface 116 can comprise any system for exchanging information with one or more I/O devices. Further, it is understood that one or more additional components (e.g., system software, math co-processing unit, etc.) not shown in FIG. 1 can be included in computer 102. To this extent, computer 102 can comprise any type of computing device such as a network server, a desktop computer, a laptop, a handheld device, a mobile phone, a pager, a personal data assistant, etc. However, if computer 102 comprises a handheld device or the like, it is understood that one or more I/O devices (e.g., a display) and/or storage system 122 could be contained within computer 102, not externally as shown.

As discussed further below, system 100 is shown including a variable receiver 130, a calculator 132, a productivity determinator 134 and other system components 136. Other system components 136 may include any other functionality necessary for carrying out the invention, but not otherwise expressly described below.

Figure 3:
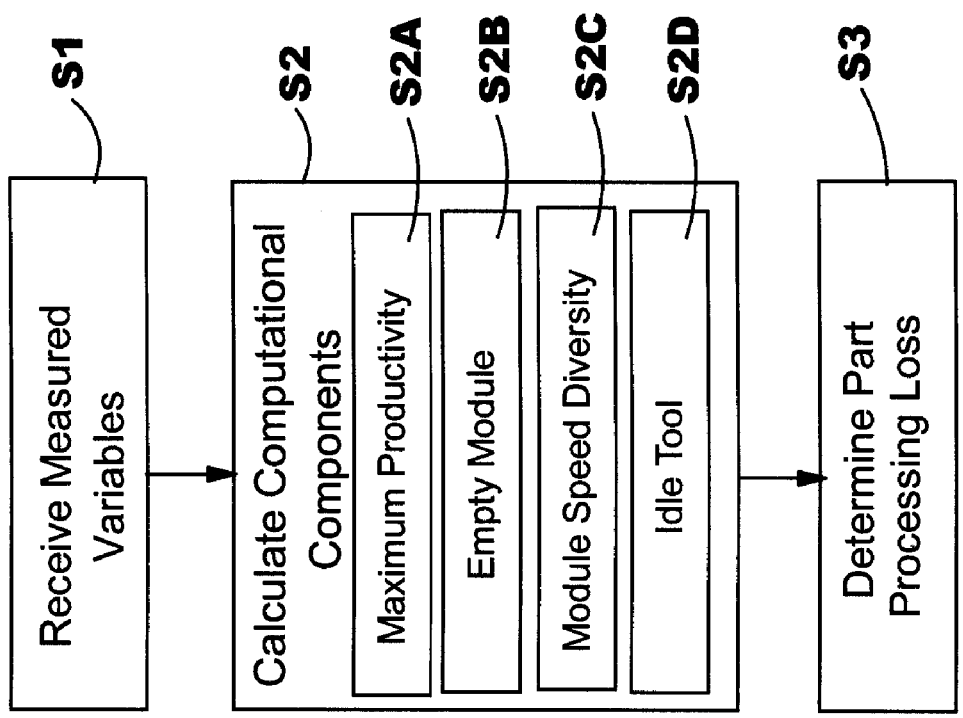
FIG. 3 shows a flow diagram of one embodiment of an operational methodology of the system of FIG. 2.

III. Operational Methodology:

Turning to FIG. 3, a flow diagram of one embodiment of an operational methodology of system 100 will now be described, in conjunction with FIGS. 1–2.

In a first step S1, variable receiver 130 receives a plurality of measured variables 90 relating to processing degradation on plurality of processing modules 11. Variables 90 used will differ depending on the particular computational components calculated, as described below. Variables 90 may be obtained in any now known or later developed fashion such as sensors and/or measuring devices on or about tool 10. As noted above, variable receiver 130 may be any now known or later developed system for receiving, i.e., receiving and/or retrieving, variables 90 from various locations. Variables 90 may be stored in a variety of different locations. For example, some variables may be stored in a tool 10 data log. Examples of variables 90 stored in a tool data log may include, but are not limited to: data for calculating a fraction of lots with empty modules between themselves and the lot in process prior to them (without tool idling) $f_{em}$ and data for calculating average duration of time associated with each empty module event $\tau_{em}$. Examples of variables 90 stored in a process recipe database (which may be part of storage system 122 or another system) may include, but are not limited to: time between batches output when achieving a maximum parts per hour ($P_{max}$) $TBBO_{MIN}$, a number of modules M, modules in which a slow (bottleneck) process rate is active B, a bottleneck module process time of a recipe (k) $\Delta_k$. Examples of variables 90 stored in a manufacturing logistics database (which may also be part of storage system 122 or another system) may include, but are not limited to: a number of wafers in a lot W, a fraction of total lots that are of a recipe i and are followed by a recipe j $f_{ij}$, and a fraction of lots starting on an idle tool $f_{idle}$.

In a second step S2, a computational component is calculated for any empty module (modules 12 in FIG. 1A), any module speed diversity (14 vs. 16 in FIG. 1B) and any idle tool event (FIG. 1C) by calculator 132. Each computational component represents a different type of productivity detractor, which will be described individually.

A preliminary step S2A to calculating each computational component includes calculator 132 calculating a maximum theoretical productivity ($P_{max}$) as:

$$P_{max}=1/[(f_1*\Delta_1)+(f_2*\Delta_2)+\ldots+(f_n*\Delta_n)],$$

where $\Delta_1, \Delta_2 \ldots \Delta_n$=bottleneck module process times for recipes 1, 2 ... n, respectively, and $f_1, f_2 \ldots f_n$=fractions of total lots of recipe 1, 2 ... n processed, respectively. $P_{max}$ represents the maximum throughput in the presence of lot specific module process speeds (i.e., a different processing time D possible for each lot).

A. Empty Module

There are many reasons why empty modules 12 can occur. Examples include, but are not limited to: the presence of a monitor wafer between product wafers (so that the module is empty of product), interrupts causing a portion of or the entire tool to temporarily cease processing, small lot sizes (there are often restrictions on the number of lots that can be in process so that if the number of modules is large and lot sizes are small there may not be sufficient wafers to fill the modules) and delay in loading the next lot.

In step S2B, calculator 132 calculates a productivity in the presence of at least one empty module (identifying the degradation below the maximum productivity $P_{max}$) according to:

$$P_{EM}=P_{max}*[1/(1+f_{em}(\tau_{em}/TBBO_{MIN}))],$$

where $P_{EM}$=productivity in the presence of at least one empty module, $P_{max}$=the maximum theoretical productivity, as calculated in step S2A, $f_{em}$=fraction of lots with empty modules between themselves and a lot in process prior to them without tool idling, $\tau_{em}$=average duration of time associated with each empty module event, and $TBBO_{MIN}$=time between batches output when achieving $P_{max}$.

$TBBO_{MIN}$ may be calculated by calculator 132 according to:

$$TBBO_{MIN}=\Delta_{avg}*W,$$

where $TBBO_{MIN}$=time between batches output when achieving $P_{max}$, $\Delta_{avg}$ is an average bottleneck module process time and W is a number of wafers in a lot.

The average bottleneck module process time $\Delta_{avg}$ is calculated according to:

$$\Delta_{avg}=[(f_1*\Delta_1)+(f_2*\Delta_2)+\ldots+(f_n*\Delta_n)],$$

where $\Delta_1, \Delta_2 \ldots \Delta_n$=bottleneck module process times for recipes 1, 2 ... n, respectively, and $f_1, f_2 \ldots f_n$=fractions of total lots of recipe 1, 2 ... n processed, respectively.

B. Module Speed Diversity

As wafers move through modules 11 sequentially, they proceed only when a wafer ahead moves forward. Accordingly, slower wafers will diminish the speed at which a wafer with a lower processing time requirement may move through tool 10. As a result, as shown in FIG. 1B, a slower lot 14 preceding a faster lot 16 will oftentimes slow the apparent rate at which faster lot 16 can proceed through tool 10. The invention assumes that there are no more than two lots on tool 10 at a particular moment and that there is a single bottleneck module, denoted as module B, which creates the decreased throughput for slower lots. That is, for a lot 14 requiring a recipe i preceding a lot 16 requiring a recipe j, with processing time Di>Dj, (i.e., recipe i is slower), the invention assumes that until the recipe j lot reaches module B, all wafers proceed through the tool 10 with slower rate according to processing time Di. Once the first wafer of the faster lot 16 reaches module B, all wafers proceed at rate Dj (even the remaining wafers having recipe i of slower lot 14). This situation is common in practice because many robot controllers for serial photolithography tools mandate that all wafers proceed at the rate of the slowest module in process.

In step S2C, calculator 132 calculates a productivity in the presence of a module speed diversity (identifying the degradation below the maximum productivity $P_{max}$) according to $$P_{MSD} = P_{max} * \left[\left[1 \bigg/ \left(1 + \left((M-B)*\sum_{i=1}^{n}\sum_{j>i}(\Delta_j - \Delta_i)*(f_{ij}-f_{ji})\right)\bigg/ TBBO_{MIN}\right)\right]\right],$$

where $P_{MSD}$=productivity in the presence of a module speed diversity, $P_{max}$=maximum theoretical P, M=number of modules, B=module at which slow bottleneck process rate is imposed, n=number of recipes, $\Delta_i$ and $\Delta_j$=bottleneck module process time for recipe i and j, respectively, $f_{ij}$=fraction of total lots that are of recipe i followed without tool idling by a lot of recipe j, $f_{ji}$=fraction of total lots that are of recipe j followed without tool idling by a lot of recipe i, and $TBBO_{MIN}$=time between batches output when achieving $P_{max}$.

Again, $TBBO_{MIN}$ may be calculated by calculator 132 according to:

$$TBBO_{MIN}=\Delta_{avg}*W,$$

where $TBBO_{MIN}$=time between batches output when achieving $P_{max}$, $\Delta_{avg}$ is an average bottleneck module process time and W is a number of wafers in a lot.

C. Idle Tool Event

Idle tool events occur each time tool 10 in its entirety is idle, resulting in reduced productivity. Whenever a lot starts processing after an idle tool event, tool 10 must first be filled before a first wafer completes processing. Idle tool events may be referred to as "flush and fill events" and can occur for reasons such as maintenance, a lack of product or a tool failure.

In step S2D, calculator 132 calculates an idle tool event productivity (identifying the degradation below the maximum productivity $P_{max}$) according to:

$$P_{ITE}=P_{max}[1/(1+f_{idle}(PF_{MAX}-1))],$$

where $P_{ITE}$=productivity in the presence of an idle tool event, $P_{max}$=maximum theoretical productivity, $f_{idle}$=fraction of lots starting on an idle tool, and $PF_{MAX}$=maximum number of lots that can be in a tool on average, where one lot is considered to be "in the tool" if at least one wafer from that lot is in production in the tool, and is calculated according to:

$$PF_{MAX}=1+(M-1)/W,$$

where M=number of modules and W=number of wafers in a lot.

D. Productivity Determination

In step S3, a productivity is determined by productivity determinator 134. In a first embodiment, each computational component described above may alone be determined to provide a productivity indicator by productivity determinator 134.

In an alternative embodiment, however, an overall productivity ($P_{overall}$) is determined based on each of the computational components. In this case, productivity determinator 134 calculates the overall productivity according to $$P_{overall} = P_{max} * P_{EM} * P_{ITE} *$$
$$\left[\left[1 \Big/ \left(1 + \left((M-B) * \sum_{i=1}^{n} \sum_{j>i} (\Delta_j - \Delta_i) * (f_{ij} - f_{ji})\right) \Big/ TBBO_{em}\right)\right]\right],$$

where $P_{overall}$=the overall productivity, $P_{max}$=a maximum theoretical P, $P_{EM}$=productivity in the presence of at least one empty module (step S2B), and $P_{ITE}$=productivity in the presence of an idle tool event (step S2D). In this case, module speed diversity productivity $P_{MSD}$ is calculated using the value: time between batches output when achieving $P_{max}$ and excepting empty module events $TBBO_{em}$ rather than time between batches output when achieving $P_{max}$ ($TBBO_{MIN}$) to except the empty modules from the calculation. Here, M=number of modules, B=module in which slow bottleneck process rate is active, n=number of recipes, $\Delta_i$ and $\Delta_j$=bottleneck module process time for recipe i and j, respectively, $f_{ij}$=fraction of total lots that are of recipe i followed without tool idling by a lot of recipe j, and $f_{ji}$=fraction of total lots that are of recipe j followed without tool idling by a lot of recipe i.

$TBBO_{em}$ is calculated according to:

$$TBBO_{em} = TBBO_{MIN} * [1/(1 + f_{em}(\tau_{em}/TBBO_{MIN}))],$$

where $TBBO_{MIN}$=time between batches output when achieving $P_{max}$, $f_{em}$=fraction of lots with empty modules between themselves and a lot in process prior to them without tool idling, $\tau_{em}$=average duration of time associated with each empty module event, and $TBBO_{MIN}$ is calculated according to: $TBBO_{MIN} = \Delta_{avg} * W$, where $\Delta_{avg}$ is an average bottleneck module process time and W is a number of wafers in a lot.

IV. Conclusion:

It is understood that the order of the above-described steps is only illustrative. To this extent, one or more steps can be performed in parallel, in a different order, at a remote time, etc. Further, one or more of the steps may not be performed in various embodiments of the invention.

It is understood that the present invention can be realized in hardware, software, a propagated signal, or any combination thereof, and may be compartmentalized other than as shown. Any kind of computer/server system(s)—or other apparatus adapted for carrying out the methods described herein—is suitable. A typical combination of hardware and software could be a general purpose computer system with a computer program that, when loaded and executed, carries out the respective methods described herein. Alternatively, a specific use computer, containing specialized hardware for carrying out one or more of the functional tasks of the invention (e.g., system 100), could be utilized. The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. Furthermore, it should be appreciated that the teachings of the present invention could be offered as a business method on a subscription or fee basis. For example, the system and/or computer could be created, maintained, supported and/or deployed by a service provider that offers the functions described herein for customers. That is, a service provider could offer the functionality described above.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method for determining productivity for a tool including a plurality of processing modules, the method comprising:

receiving a plurality of variables relating to processing degradation on the plurality of processing modules;

calculating a computational component for any empty module, any module speed diversity and any idle tool event, wherein module speed diversity occurs when two lots with different speeds having different module processing times are in production within the tool; and determining the productivity based on at least one of the computational components.

2. The method of claim 1, wherein the calculating step includes calculating a theoretical maximum productivity ($P_{max}$) as:

$$P_{max} = 1/[(f_1 * \Delta_1) + (f_2 * \Delta_2) + \ldots + (f_n * \Delta_n)],$$

where $\Delta_1, \Delta_2 \ldots \Delta_n$=bottleneck module process times for recipes 1, 2 . . . n, respectively, and $f_1, f_2 \ldots f_n$=fractions of total lots of recipe 1, 2 . . . n processed, respectively.

3. The method of claim 1, wherein the calculating step includes calculating an empty module component according to:

$$P_{EM} = P_{max} * [1/(1 + f_{em}(\tau_{em}/TBBO_{MIN}))],$$

where $P_{EM}$=productivity in the presence of at least one empty module, $P_{max}$=a maximum theoretical productivity, $f_{em}$=fraction of lots with empty modules between themselves and a lot in process prior to them without tool idling, $\tau_{em}$=average duration of time associated with each empty module event, and $TBBO_{MIN}$=time between batches output when achieving $P_{max}$.

4. The method of claim 3, wherein $TBBO_{MIN}$ is calculated according to:

$$TBBO_{MIN} = \Delta_{avg} * W,$$

where $TBBO_{MIN}$=time between batches output when achieving $P_{max}$, $\Delta_{avg}$ is an average bottleneck module process time and W is a number of wafers in a lot.

5. The method of claim 1, wherein the calculating step includes calculating a module speed diversity component according to:

$$P_{MSD} = P_{max} * \left[\left(1 / \left(1 + \left((M-B) * \sum_{i=1}^{n} \sum_{j>i} (\Delta_j - \Delta_i) * (f_{ij} - f_{ji})\right) / TBBO_{MIN}\right)\right)\right],$$

where $P_{MSD}$=productivity in the presence of a module speed diversity, $P_{max}$=a maximum theoretical productivity, M=number of modules, B=module in which slow bottleneck process rate is active, n=number of recipes, $\Delta_i$ and $\Delta_j$=bottleneck module process time for recipe i and j, respectively, $f_{ij}$=fraction of total lots that are of recipe i followed without tool idling by a lot of recipe j, $f_{ji}$=fraction of total lots that are of recipe j followed without tool idling by a lot of recipe i, and $TBBO_{MIN}$=time between batches output when achieving $P_{max}$.

6. The method of claim 5, wherein $TBBO_{MIN}$ is calculated according to:

$$TBBO_{MIN} = \Delta_{avg} * W,$$

where $TBBO_{MIN}$=time between batches output when achieving $P_{max}$, $\Delta_{avg}$ is an average bottleneck module process time and W is a number of wafers in a lot.

7. The method of claim 1, wherein the calculating step includes calculating an idle tool event component according to $$P_{ITE} = P_{max} * [1/(1 + f_{idle}(PF_{MAX} - 1))],$$

where $P_{ITE}$=productivity in the presence of an idle tool event, $P_{max}$=a maximum theoretical productivity, $f_{idle}$=fraction of lots starting on an idle tool, and $PF_{MAX}$=maximum number of lots that can be in a tool on average and is calculated according to:

$$PF_{MAX} = 1 + (M-1)/W,$$

where M=number of modules and W=number of wafers in a lot.

8. The method of claim 1, wherein the determining step includes calculating the productivity as an overall productivity based on each component according to:

$$P_{overall} = P_{max} * P_{EM} * P_{ITE} * \left[\left(1 / \left(1 + \left((M-B) * \sum_{i=1}^{n} \sum_{j>i} (\Delta_j - \Delta_i) * (f_{ij} - f_{ji})\right) / TBBO_{em}\right)\right)\right],$$

where $P_{overall}$=the overall productivity, $P_{max}$=a maximum theoretical productivity, $P_{EM}$=productivity in the presence of at least one empty module, $P_{ITE}$=productivity in the presence of an idle tool event, M=number of modules, B=module in which slow bottleneck process rate is active, n=number of recipes, $\Delta_i$ and $\Delta_j$=bottleneck module process time for recipe i and j, respectively, $f_{ij}$=fraction of total lots that are of recipe i followed without tool idling by a lot of recipe j, $f_{ji}$=fraction of total lots that are of recipe j followed without tool idling by a lot of recipe i, and $TBBO_{em}$=time between batches output when achieving $P_{max}$ and excepting empty module events.

9. The method of claim 8, wherein the $TBBO_{em}$ is calculated according to:

$$TBBO_{em} = TBBO_{MIN} * [1/(1 + f_{em}(\tau_{em}/TBBO_{MIN}))],$$

where $TBBO_{MIN}$=time between batches output when achieving $P_{max}$, $f_{em}$=fraction of lots with empty modules between themselves and a lot in process prior to them without tool idling, $\tau_{em}$=average duration of time associated with each empty module event, and $TBBO_{MIN}$ is calculated according to: $TBBO_{MIN} = \Delta_{avg} * W$, where $\Delta_{avg}$ is an average bottleneck module process time and W is a number of wafers in a lot.

10. A system with at least one computer having at least one computer processor for determining productivity for a tool including a plurality of processing modules, including:
   means for receiving a plurality of variables relating to processing degradation on the plurality of processing modules;
   means for storing the plurality of variables;
   means for calculating a computational component for any empty module, any module speed diversity and any idle tool event, wherein module speed diversity occurs when two lots with different speeds having different module processing times are in production within the tool; and
   means for determining the productivity based on at least one of the computational components.

11. The system of claim 10, wherein the calculating means includes means for calculating a theoretical maximum productivity ($P_{max}$) as:

$$P_{max} = 1/[(f_1 * \Delta_1) + (f_2 * \Delta_2) + \ldots + (f_n * \Delta_n)],$$

where $\Delta_1, \Delta_2 \ldots \Delta_n$=bottleneck module process times for recipes 1, 2 . . . n, respectively, and $f_1, f_2 \ldots f_n$=fractions of total lots of recipe 1, 2 . . . n processed, respectively.

12. The system of claim 1, wherein the calculating means includes means for calculating an empty module component according to:

$$P_{EM} = P_{max} * [1/(1 + f_{em}(\tau_{em}/TBBO_{MIN}))],$$

where $P_{EM}$=productivity in the presence of at least one empty module, $P_{max}$=a maximum theoretical productivity, $f_{em}$=fraction of lots with empty modules between themselves and a lot in process prior to them without tool idling, $\tau_{em}$=average duration of time associated with each empty module event, and $TBBO_{MIN}$=time between batches output when achieving $P_{max}$.

13. The system of claim 12, wherein $TBBO_{MIN}$ is calculated according to:

$$TBBO_{MIN} = \Delta_{avg} * W,$$

where $TBBO_{MIN}$=time between batches output when achieving $P_{max}$, $\Delta_{avg}$ is an average bottleneck module process time and W is a number of wafers in a lot.

14. The system of claim 10, wherein the calculating means includes means for calculating a module speed diversity component according to:

$$P_{MSD} =$$

-continued $$P_{\max} * \left[\left(1 \Big/ \left(1 + \left((M-B) * \sum_{i=1}^{n}\sum_{j>i}(\Delta_j - \Delta_i)*(f_{ij}-f_{ji})\right)\Big/ TBBO_{MIN}\right)\right)\right],$$

where $P_{MSD}$=productivity in the presence of a module speed diversity, $P_{max}$=a maximum theoretical productivity, M=number of modules, B=module in which slow bottleneck process rate is active, n=number of recipes, $\Delta_i$ and $\Delta_j$=bottleneck module process time for recipe i and j, respectively, $f_{ij}$=fraction of total lots that are of recipe i followed without tool idling by a lot of recipe j, $f_{ji}$=fraction of total lots that are of recipe j followed without tool idling by a lot of recipe i, and $TBBO_{MIN}$=time between batches output when achieving $P_{max}$.

15. The system of claim 14, wherein $TBBO_{MIN}$ is calculated according to:

$$TBBO_{MIN} = \Delta_{avg} * W,$$

where $TBBO_{MIN}$=time between batches output when achieving $P_{max}$, $\Delta_{avg}$ is an average bottleneck module process time and W is a number of wafers in a lot.

16. The system of claim 10, wherein the calculating means includes means for calculating an idle tool event component according to $$P_{ITE} = P_{max} * [1/(1+f_{idle}(PF_{MAX}-1))],$$

where $P_{ITE}$=productivity in the presence of an idle tool event, $P_{max}$=a maximum theoretical productivity, $f_{idle}$=fraction of lots starting on an idle tool, and $PF_{MAX}$=maximum number of lots that can be in a tool on average and is calculated according to:

$$PF_{MAX} = 1 + (M-1)/W,$$

where M=number of modules and W=number of wafers in a lot.

17. The system of claim 10, wherein the determining means includes means for calculating an overall productivity based on each component according to:

$$P_{overall} = P_{\max} * P_{EM} * P_{ITE} *$$
$$\left[\left(1 \Big/ \left(1 + \left((M-B) * \sum_{i=1}^{n}\sum_{j>i}(\Delta_j - \Delta_i)*(f_{ij}-f_{ji})\right)\Big/ TBBO_{em}\right)\right)\right],$$

where $P_{overall}$=the overall productivity, $P_{max}$=a maximum theoretical productivity, $P_{EM}$=productivity in the presence of at least one empty module, $P_{ITE}$=productivity in the presence of an idle tool event, M=number of modules, B=module in which slow bottleneck process rate is active, n=number of recipes, $\Delta_i$ and $\Delta_j$=bottleneck module process time for recipe i and j, respectively, $f_{ij}$=fraction of total lots that are of recipe i followed without tool idling by a lot of recipe j, $f_{ji}$=fraction of total lots that are of recipe j followed without tool idling by a lot of recipe i, and $TBBO_{em}$=time between batches output when achieving $P_{max}$ and excepting empty module events.

18. The system of claim 17, wherein the $TBBO_{em}$ is calculated according to:

$$TBBO_{em} = TBBO_{MIN} * [1/(1+f_{em}(\tau_{em}/TBBO_{MIN}))],$$

where $TBBO_{MIN}$=time between batches output when achieving $P_{max}$, $f_{em}$=fraction of lots with empty modules between themselves and a lot in process prior to them without tool idling, $\tau_{em}$=average duration of time associated with each empty module event, and $TBBO_{MIN}$ is calculated according to: $TBBO_{MIN}=\Delta_{avg}*W$, where $\Delta_{avg}$ is an average bottleneck module process time and W is a number of wafers in a lot.

19. A program product stored on a computer readable medium for determining productivity for a tool including a plurality of processing modules the computer readable medium comprising program code for performing the following steps:

receiving a plurality of variables relating to processing degradation on the plurality of processing modules;

calculating a computational component for any empty module, any module speed diversity and any idle tool event, wherein module speed diversity occurs when two lots with different speeds having different module processing times are in production within the tool; and determining the productivity based on at least one of the computational components.

20. The program product of claim 19, further comprising the step of calculating a maximum theoretical productivity ($P_{max}$) as:

$$P_{max} = 1/[(f_1*\Delta_1)+(f_2*\Delta_2)+ \ldots +(f_n*\Delta_n)],$$

where $\Delta_1, \Delta_2 \ldots \Delta_n$=bottleneck module process times for recipes 1, 2 . . . n, respectively, and $f_1, f_2 \ldots f_n$=fractions of total lots of recipe 1, 2 . . . n processed, respectively.

* * * * *